C. S. JOHNSTON.
DEMOUNTABLE RIM.
APPLICATION FILED DEC. 28, 1915.
1,218,945.
Patented Mar. 13, 1917.
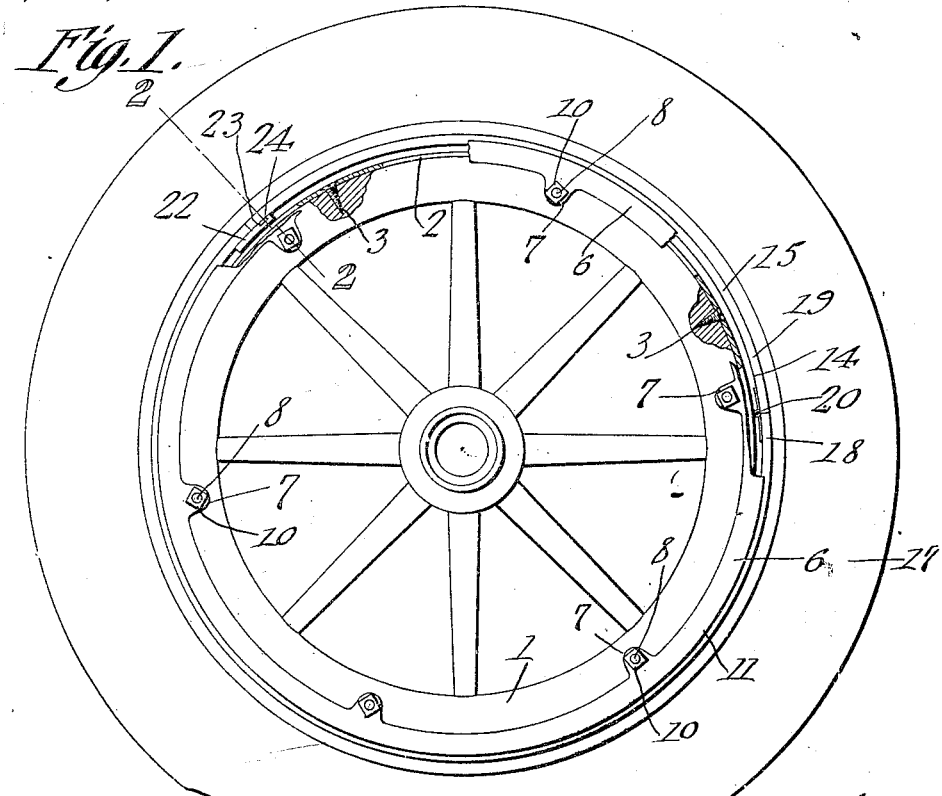
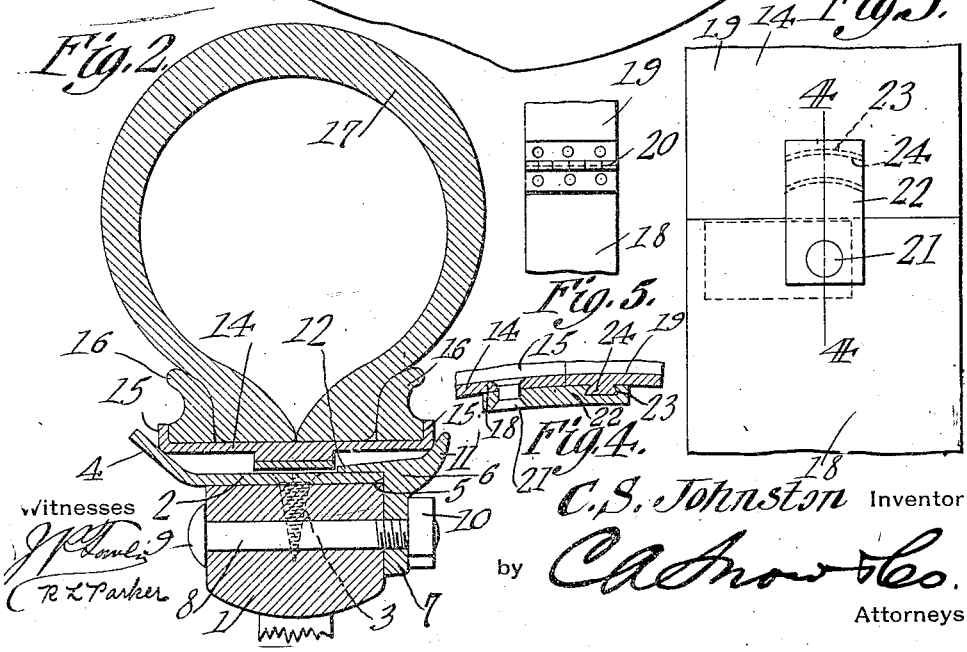
C. S. Johnston Inventor

UNITED STATES PATENT OFFICE.

CLARENCE S. JOHNSTON, OF GLENDIVE, MONTANA, ASSIGNOR OF ONE-FOURTH TO CLARENCE H. CROCKARD AND ONE-FOURTH TO SAM H. CLARK, OF BISMARCK, NORTH DAKOTA.

DEMOUNTABLE RIM.

1,218,945. Specification of Letters Patent. Patented Mar. 13, 1917.

Application filed December 28, 1915. Serial No. 69,094.

*To all whom it may concern:*

Be it known that I, CLARENCE S. JOHNSTON, a citizen of the United States, residing at Glendive, in the county of Dawson and State of Montana, have invented a new and useful Demountable Rim, of which the following is a specification.

The device forming the subject matter of this application is a vehicle wheel, and one object of the invention is to provide novel means for assembling the tire holding rim with the felly of a wheel.

Another object of the invention is to provide novel means for connecting together the constituent parts of the tire holding rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing:—

Figure 1 shows in side elevation, a wheel constructed in accordance with the present invention, parts being broken away;

Fig. 2 is a cross section on the line 2—2 of Fig. 1;

Fig. 3 is a fragmental bottom plan showing a portion of the tire holding rim;

Fig. 4 is a section on the line 4—4 of Fig. 3;

Fig. 5 is a fragmental bottom plan showing another portion of the tire holding rim.

In the accompanying drawings, the numeral 1 indicates a felly, circumscribed by a felly band 2 held to the felly by means of securing elements 3, the felly band 2 being supplied at one side with an angularly disposed lip 4. The opposite edge 5 of the felly band 2 remains flush with one side face of the felly 1, as clearly indicated in Fig. 2.

Applied to the said side face of the felly 1 is an annular side plate 6 having extended ears 7 receiving bolts 8 which pass through the felly 1, the heads 9 of the bolts engaging the opposite side face of the felly 1, and there being nuts 10 threaded onto the bolts, the nuts engaging the ears 7 of the side plate 6. The side plate 6 embodies an annular lip 11, corresponding to the lip 4 and includes also an annular flange 12, lapped on the outer face of the felly band 2.

Supported on the lips 11 and 4 in spaced relation to the felly band 2 is an annular rim 14 having side flanges 15 holding in place bead rings 16 coöperating with a tire 17 of any desired sort. The rim 14 comprises parts 18 and 19, united by a hinge 20. Carried by the part 18 of the rim is a pivot element 21 on which is mounted to swing a latch 22 provided with a transverse dove-tailed recess curved to form a part of an arc the center of which is the pivot element 21. The part 19 of the rim 14 is provided with a dove-tailed lug 24 adapted to be received in the recess 23, and curved on an arc the center of which is the pivot element 21.

In practical operation, the parts 18 and 19 of the rim, at their free ends, are swung outwardly until the said parts of the rim coact with the bead rings 16 and the tire 17. Then the latch 22 is swung on the pivot element 21 until the recess 23 receives the lug 24 on the part 19. The rim 14 then is slid transversely of the felly 1, until one flange 15 of the rim abuts against the lip 4. The side plate 6 is then mounted in place, its lip 11 coacting with the other flange 15 on the rim 14 in a manner which will be obvious from Fig. 3 of the drawings. The side plate 6 is held in place by tightening up the nuts 10 on the bolts 8.

Having thus described the invention, what is claimed is:—

In a device of the class described, a rim comprising relatively movable ends; a pivot element carried by one end; a latch mounted to swing on the pivot element and located beneath the ends, the latch being provided on its outer face with a dove-tailed recess extended entirely across the latch and struck on an arc the center of which is the pivot element, the other of said ends being provided on its inner face with a dove-tailed lug received in the recess, and curved on an arc the center of which is the pivot element.

In testimony that I claim the foregoing as my own, I have hereto affixed my signature in the presence of two witnesses.

CLARENCE S. JOHNSTON.

Witnesses:
T. F. HAGAN,
M. J. HUGHES.